No. 877,283. PATENTED JAN. 21, 1908.
E. BARRATH.
CAMERA ATTACHMENT.
APPLICATION FILED MAY 29, 1907.
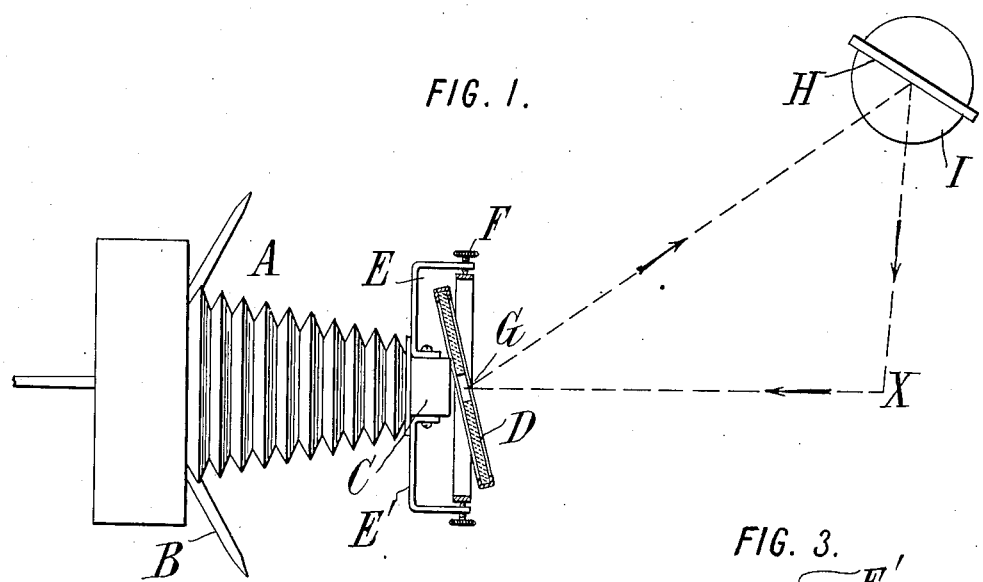
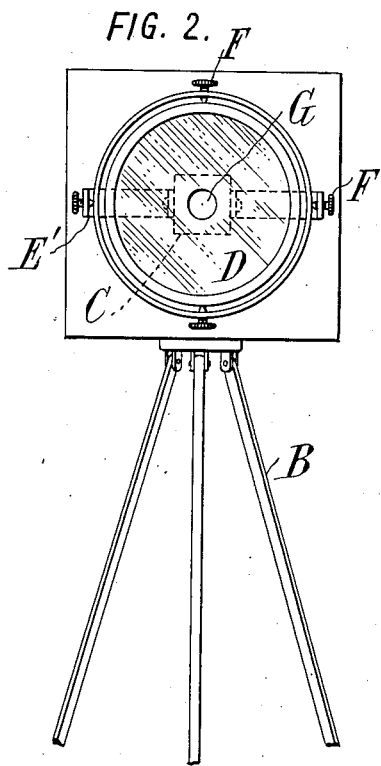
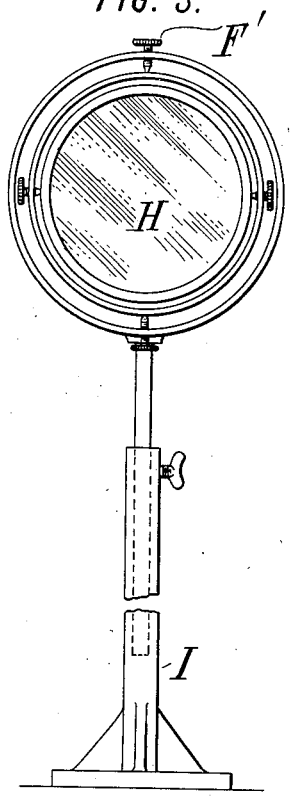
WITNESSES:
INVENTOR:
Edward Barrath,
By Attorneys

UNITED STATES PATENT OFFICE.

EDWARD BARRATH, OF NEW YORK, N. Y., ASSIGNOR OF ONE-THIRD TO OTTO F. NEWMAN, OF NEW YORK, N. Y.

CAMERA ATTACHMENT.

No. 877,283.　　　　Specification of Letters Patent.　　　　Patented Jan. 21, 1908.

Application filed May 29, 1907. Serial No. 376,238.

*To all whom it may concern:*

Be it known that I, EDWARD BARRATH, a citizen of the United States, residing in the borough of Brooklyn, county of Kings, city and State of New York, have invented certain new and useful Improvements in Camera Attachments, of which the following is a specification.

This invention relates to attachments for cameras, and aims to provide an improved construction which is especially adapted for portraiture photography.

In taking portraits by photography under the present conditions, it is necessary for the subject to rely almost entirely upon the taste and judgment of the photographer, so far as concerns the pose of the sitter.

It is the object of my invention to provide means whereby the subject may pose himself in the exact position he wishes, and may observe in advance the general effect of the portrait as it will appear in the finished picture. To this end I combine with a photographic camera, a mirror or other reflector, which is preferably mounted directly in front of the camera, and provided with an aperture in line with the lens of the camera. It is important, in order that the precise position of the subject may be observed, that the mirror shall be arranged as nearly as may be in line with the plate on which the picture is to be taken and shall be arranged at substantially the same angle as the latter.

My invention also includes means whereby profile portraits may be taken under the same conditions, that is to say, the subject is enabled to observe the general effect of the picture immediately before or during the taking of the latter.

Referring to the accompanying drawings which illustrate one embodiment of my invention,—Figure 1 is a top or plan view partly in section of a camera showing the preferred form of my invention; Fig. 2 is a front view of a camera; Fig. 3 is a front elevation of the auxiliary or second mirror.

In the drawings, let A designate any suitable form of camera, which is shown as mounted on a tripod B; the lens frame or box is indicated by the letter C; I have not shown the usual shutter mechanism, as this of itself forms no part of the present invention.

According to my invention I combine with the camera A, a mirror or other reflector D, which is shown as mounted in gimbal rings supported upon two brackets E E' screwed to the lens box of the camera. By this means the mirror may be adjusted in any direction and clamped in position by thumb screws F F. I provide the mirror D with an aperture G, which is shown as arranged in the center of the mirror and directly opposite or in line with the lens of the camera, so that the mirror does not interfere with the working of the shutter or the exposure of the plate, while at the same time it entirely surrounds the lens and is capable of being arranged at substantially the same angle as the plate.

Assuming that the subject is arranged at the point X and that a full-faced view is to be taken, it will be seen that the sitter can by the aid of the mirror, arrange his pose as desired or as may be best adapted, in his own judgment, to produce an artistic or other desired effect. This is accomplished without the necessity of relying upon the skill or judgment of the photographer.

Another important feature of the invention is that it enables the subject to observe, and if necessary to vary, the effect of the lines and shadows upon the face, which contribute so largely to artistic portraiture. By arranging the mirror directly in front of the camera in full-face work, these effects may be observed without any unnatural effort or undesirable change in position on the part of the subject.

For taking other than full-faced portraits, as for instance profiles, my invention provides a second or supplemental mirror, which is so arranged with reference to the first mirror and the position of the sitter, that the precise view to be taken of the subject can be observed by him in the position in which the eyes are naturally directed.

In Fig. 1, I have shown at H a second mirror mounted upon a suitable stand I, which mirror is arranged at the proper point with relation to the camera and the subject, so that the latter may by looking into the supplemental mirror observe the primary reflection in the main mirror D. It will ordinarily be necessary to adjust the latter at an angle, such for instance as that shown in the drawing, in order that this effect may be obtained. The exact position of the supplemental mirror H, and the exact inclination of the main mirror D, will depend of course upon the position of the subject and the view which it is desired to take. As shown in Fig. 1, the parts are arranged approximately in the positions necessary for a full profile view.

The mirror H is mounted in gimbal rings on the stand I, the latter being constructed telescopically so that the height of the mirror can be adjusted.

While it is preferable that the mirror D be attached directly to the camera, this is not essential, since the mirror could be supported independently thereof if desired. Furthermore it will be understood that while I have shown and described the preferred form of my invention, I do not wish to be limited thereto, as it is susceptible of numerous changes in construction without departing from the invention. For instance instead of the mirror being provided with an aperture, the backing of the mirror may be omitted at the center or other part thereof, so that the light will pass through the unsilvered glass. This and other equivalent constructions are intended to be covered by the term "aperture" as used herein.

It will also be understood that the apertured mirror may be mounted in any suitable way so long as it is capable of being used as described.

I claim as my invention:—

1. The combination with a photographic camera, of an apertured mirror mounted with its aperture in line with the lens of the camera and adapted to reflect the likeness of the person whose photograph is to be taken, so that said reflection can be observed by such person.

2. The combination with a photographic camera, of a mirror having an aperture, said mirror being arranged with such aperture in front of the lens of said camera, whereby the person whose photograph is to be taken can observe his reflection in said mirror.

3. The combination with a photographic camera, of a mirror having an aperture, said mirror being arranged with such aperture in front of the lens of said camera, and means for adjusting such mirror to various angles with relation to such camera.

4. The combination with a photographic camera, of a mirror connected with the lens frame of such camera, and adjustable therewith.

5. The combination with a photographic camera, of a mirror connected with the lens frame of such camera, and adjustable therewith, and means for adjusting such mirror to various angles with relation to such lens.

6. The combination with a photographic camera, of a mirror connected with such camera, and means for adjusting such mirror so that it may be tilted in any direction with relation to such camera.

7. The combination of a photographic camera, a mirror arranged close to such camera and adapted to reflect the subject of the photograph, and a second mirror so arranged with relation to said first mirror as to enable the subject to observe the first reflection in the second mirror.

8. The combination of a photographic camera, an apertured mirror arranged with its aperture in line with the lens of the camera and adapted to reflect the subject of the photograph, and a second mirror so arranged with relation to said first mirror as to enable the subject to observe the first reflection in the second mirror.

In witness whereof, I have hereunto signed my name in the presence of two subscribing witnesses.

EDWARD BARRATH.

Witnesses:
EUGENE V. MYERS,
FRED WHITE.